(12) United States Patent
Park

(10) Patent No.: US 11,001,254 B2
(45) Date of Patent: May 11, 2021

(54) METHOD OF PROVIDING PARKING INFORMATION FOR AUTONOMOUS PARKING, SERVICE SERVER FOR PROVIDING PARKING INFORMATION, AND SYSTEM FOR PROVIDING PARKING INFORMATION

(71) Applicants: HYUNDAI MOTOR COMPANY, Seoul (KR); KIA MOTORS CORPORATION, Seoul (KR)

(72) Inventor: Sung-Hwan Park, Seongnam-si (KR)

(73) Assignees: Hyundai Motors Company, Seoul (KR); KIA Motors Corporation, Seoul (KR)

( * ) Notice: Subject to any disclaimer, the term of this patent is extended or adjusted under 35 U.S.C. 154(b) by 253 days.

(21) Appl. No.: 16/177,608

(22) Filed: Nov. 1, 2018

(65) Prior Publication Data

US 2019/0135275 A1 May 9, 2019

(30) Foreign Application Priority Data

Nov. 3, 2017 (KR) .......................... 10-2017-0146098

(51) Int. Cl.
*B60W 30/06* (2006.01)
*G05D 1/00* (2006.01)
*G01C 21/36* (2006.01)
*G01S 19/14* (2010.01)
*G01C 21/34* (2006.01)
(Continued)

(52) U.S. Cl.
CPC ......... *B60W 30/06* (2013.01); *B62D 15/0285* (2013.01); *G01C 21/3407* (2013.01); *G01C 21/3484* (2013.01); *G01C 21/3602* (2013.01); *G01S 19/14* (2013.01); *G05D 1/0088* (2013.01);
(Continued)

(58) Field of Classification Search
CPC ............... B60W 30/06; B62D 15/0285; G01C 21/3407; G01C 21/3484; G01C 21/3602; G01C 21/3685; G01S 19/14; G05D 1/0088; G05D 1/0274; G05D 1/0278; G05D 1/0282; G05D 2201/0213; G08G 1/0112; G08G 1/0133; G08G 1/0141; G08G 1/096827; G08G 1/096844; G08G 1/143; G08G 1/146
See application file for complete search history.

(56) References Cited

U.S. PATENT DOCUMENTS 9,558,664 B1 * 1/2017 Gaebler ............... G08G 1/0112
2017/0060133 A1 * 3/2017 Seo ........................ G08G 1/143
(Continued)

FOREIGN PATENT DOCUMENTS

KR 10-1637842 B1 7/2016

*Primary Examiner* — Anshul Sood
(74) *Attorney, Agent, or Firm* — Brinks Gilson & Lione

(57) ABSTRACT

A method of providing parking information for autonomous parking, may include receiving, by an autonomous driving vehicle based on a connected car entering a parking lot, pieces of global positioning system (GPS) information for a driving route in the parking lot from the connected car, configuring a map of the parking lot on the basis of the received pieces of GPS information, and providing a driving route on the map of the parking lot according to a request of the autonomous driving vehicle entering the parking lot, wherein the driving route is selected by a weight value assigned to each route on the map of the parking lot.

11 Claims, 11 Drawing Sheets

(51) Int. Cl.
*G05D 1/02* (2020.01)
*B62D 15/02* (2006.01)
(52) U.S. Cl.
CPC ....... *G05D 1/0278* (2013.01); *G01C 21/3685* (2013.01)

(56) References Cited

U.S. PATENT DOCUMENTS

| | | | |
|---|---|---|---|
| 2018/0052860 A1* | 2/2018 | Hayes | G07B 15/02 |
| 2018/0121833 A1* | 5/2018 | Friedman | G06Q 10/0631 |
| 2018/0247535 A1* | 8/2018 | Mielenz | G08G 1/146 |
| 2019/0096253 A1* | 3/2019 | Stenneth | G08G 1/144 |

* cited by examiner

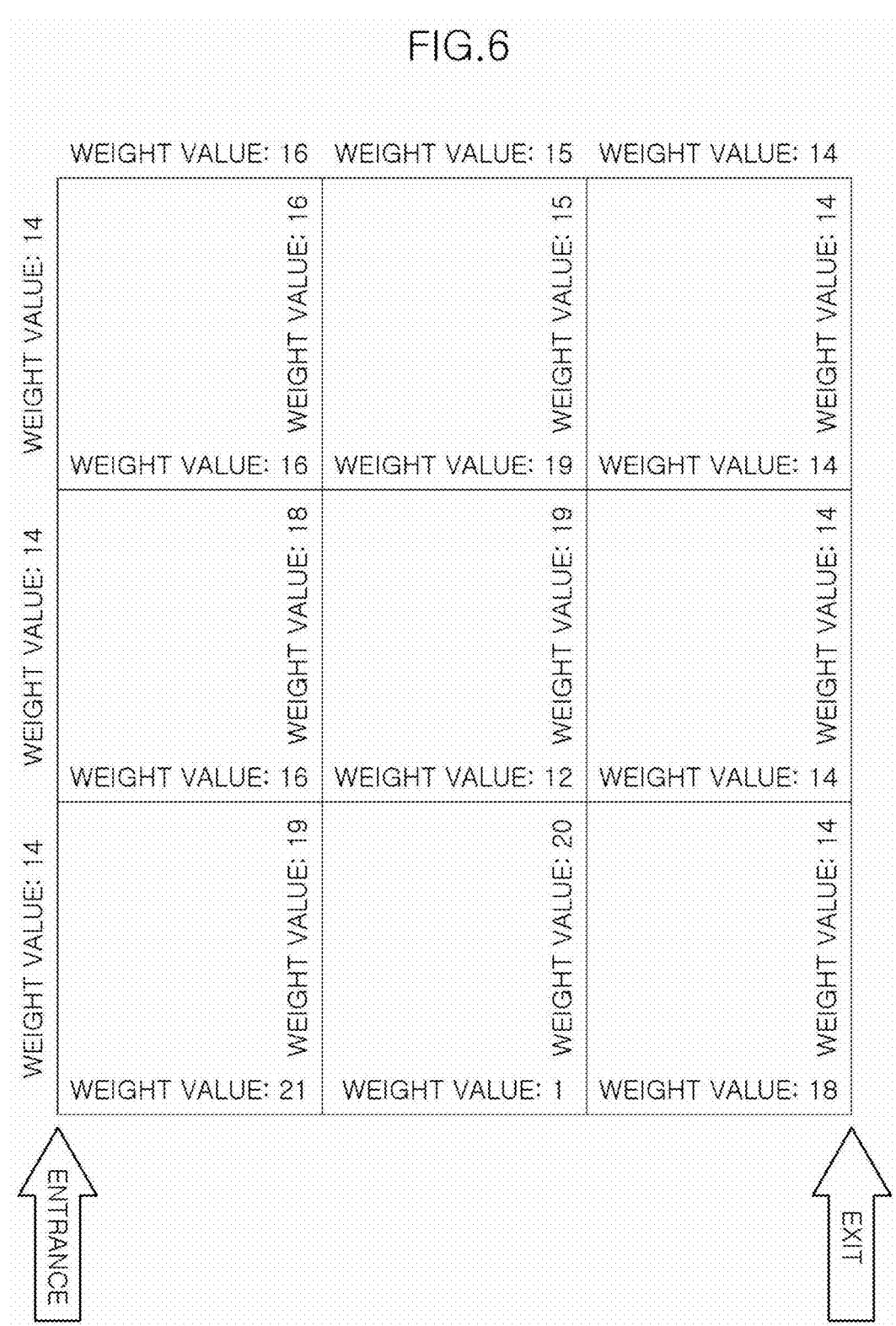

FIG.7

| WEIGHT VALUE: 7 | WEIGHT VALUE: 5 | WEIGHT VALUE: 6 | WEIGHT VALUE: 7 | |
|---|---|---|---|---|
| | WEIGHT VALUE: 5 | WEIGHT VALUE: 6 | WEIGHT VALUE: 7 | WEIGHT VALUE: 7 |
| | WEIGHT VALUE: 5 | WEIGHT VALUE: 2 | WEIGHT VALUE: 7 | |
| WEIGHT VALUE: 7 | WEIGHT VALUE: 3 | WEIGHT VALUE: 2 | WEIGHT VALUE: 7 | WEIGHT VALUE: 7 |
| | WEIGHT VALUE: 5 | WEIGHT VALUE: 9 | WEIGHT VALUE: 7 | |
| WEIGHT VALUE: 7 | WEIGHT VALUE: 2 | WEIGHT VALUE: 1 | WEIGHT VALUE: 7 | WEIGHT VALUE: 7 |
| | WEIGHT VALUE: 0 | WEIGHT VALUE: 20 | WEIGHT VALUE: 3 | |

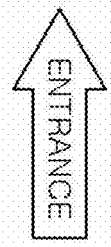
ENTRANCE

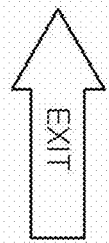
EXIT

METHOD OF PROVIDING PARKING INFORMATION FOR AUTONOMOUS PARKING, SERVICE SERVER FOR PROVIDING PARKING INFORMATION, AND SYSTEM FOR PROVIDING PARKING INFORMATION

CROSS-REFERENCE TO RELATED APPLICATION

This application claims priority to and the benefit of Korean Patent Application No. 10-2017-0146098, filed on Nov. 3, 2017, the entire contents of which are incorporated herein by reference in its entirety.

FIELD

The present disclosure relates to a method of providing parking route information for autonomous parking of an autonomous vehicle, a service server for providing parking information, and a system for providing parking information.

BACKGROUND

The statements in this section merely provide background information related to the present disclosure and may not constitute prior art.

A connected car is a vehicle capable of accessing the Internet by converging a car with information technology (IT), and the connected car may be connected to other vehicles or traffic and communication infrastructures to allow a danger warning, a real-time navigation, remote vehicle control, and a management service.

Further, on the basis of the connected car, research has been conducted to allow autonomous driving in which a situation is determined by a vehicle through a precise map and various sensors of the vehicle, such as a global positioning system (GPS) and the like, to reach a destination even though a driver does not manipulate a steering wheel, an accelerator pedal, a brake, and the like.

When a connected car enters a parking lot, it may not obtain information for parking by searching for a parking space. The connected car may perform autonomous parking to find a parking space by relying solely on the sensors of the connected car, such that autonomous parking may not always be successful.

In some instances, the connected car may be led out of the parking lot while searching for a place where obstacles are absent, or when there is no operation scenario for each situation that might be encountered, the connected car may have difficulty constructing a subsequent operation scenario after encountering a front-side obstacle.

The contents described in the above are to help the understanding of the background, and may include what is not previously known to a person of ordinary skill in the art.

SUMMARY

The present disclosure describes a system and a method of efficiently providing parking information to an autonomous driving vehicle entering a parking lot, a service server for providing parking information, and a system for providing parking information.

The following description describes various aspects of such a system and method. Also, it will be apparent to those skilled in the art that aspects of the present disclosure can be realized by the means as claimed and combinations thereof.

In one aspect, a method of providing parking information for autonomous parking is provided, which may include receiving, by an autonomous driving vehicle based on a connected car entering a parking lot, pieces of global positioning system (GPS) information for a driving route in the parking lot from the connected car, configuring a map of the parking lot on the basis of the received pieces of GPS information, and providing a driving route on the map of the parking lot according to a request of the autonomous driving vehicle entering the parking lot, wherein the driving route is selected by a weight value assigned to each route on the map of the parking lot.

The method may further include, when an amount of the pieces of GPS information collected from the connected car becomes larger, assigning a higher weight value to each of driving routes on the map.

The method may further include assigning a lower weight value to a driving route after a predetermined period of time among each of the driving routes on the map.

The method may further include selecting a driving route having a low weight value and providing the selected driving route to the autonomous driving vehicle entering the parking lot.

The method may further include selecting the driving route by excluding a driving route in which an obstacle is detected among the driving routes on the map.

The method may further include selecting a position farthest away from an entrance of the parking lot as a waypoint on the driving route, and selecting the waypoint as a next destination.

The method may further include additionally assigning a weight value to the driving route on the map where the autonomous driving vehicle passes.

The method may further include selecting the driving route by excluding a driving route on the map, which is adjacent to an entrance and an exit of the parking lot.

The present disclosure includes, in one form, a service server for executing the above-described method and providing parking information for autonomous parking, and a system including a connected car and providing parking information.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 6 and 7 are diagrams illustrating examples of calculating a weight value through the method of calculating a weight value of FIG. 5;

Figure 1:
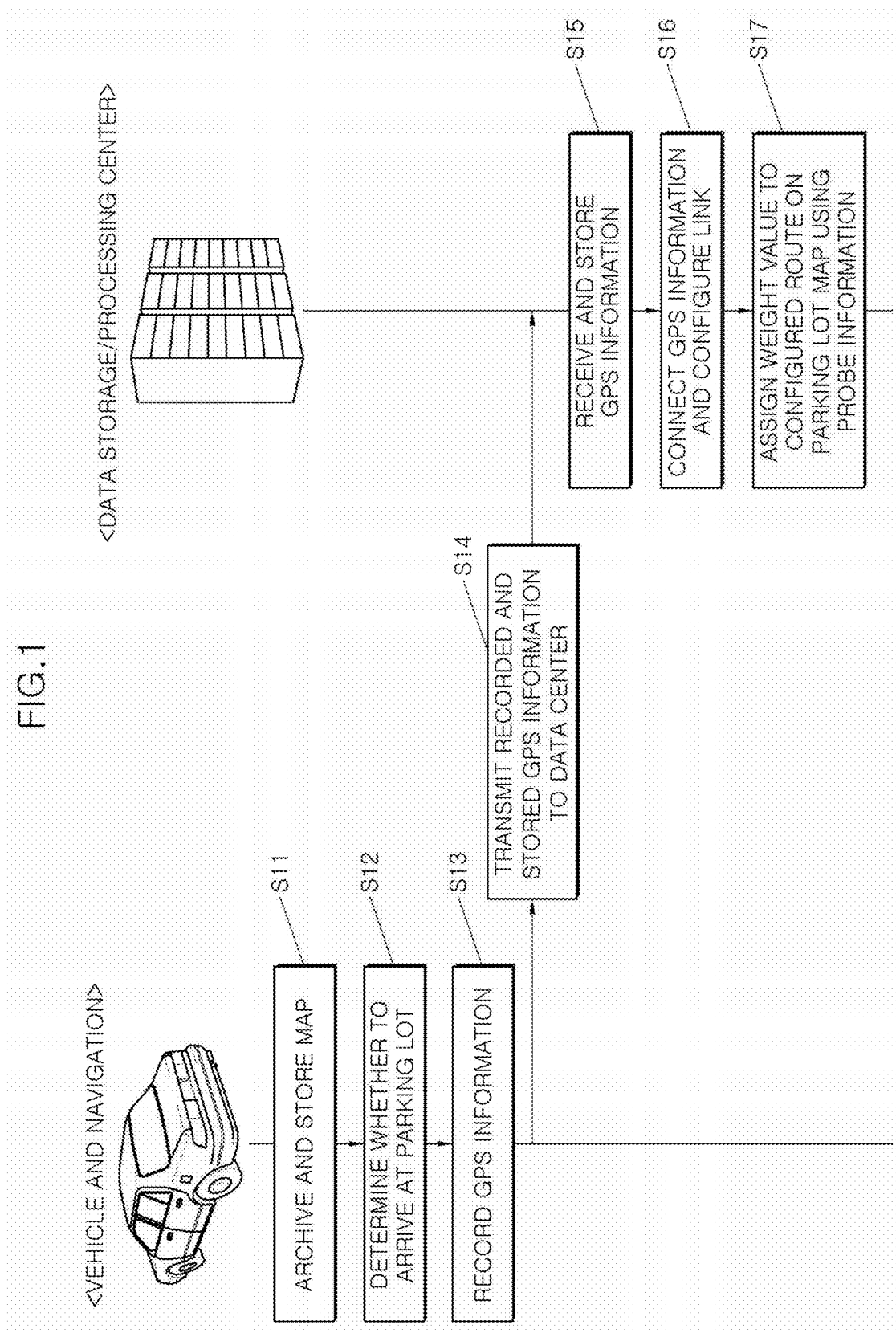
FIG. 1 is a diagram illustrating a method of generating a parking route in a method of providing parking information.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In certain aspects, known technologies or detailed descriptions may be reduced or omitted to avoid obscuring appreciation of the disclosure by a person of ordinary skill in the art.

Figure 2:
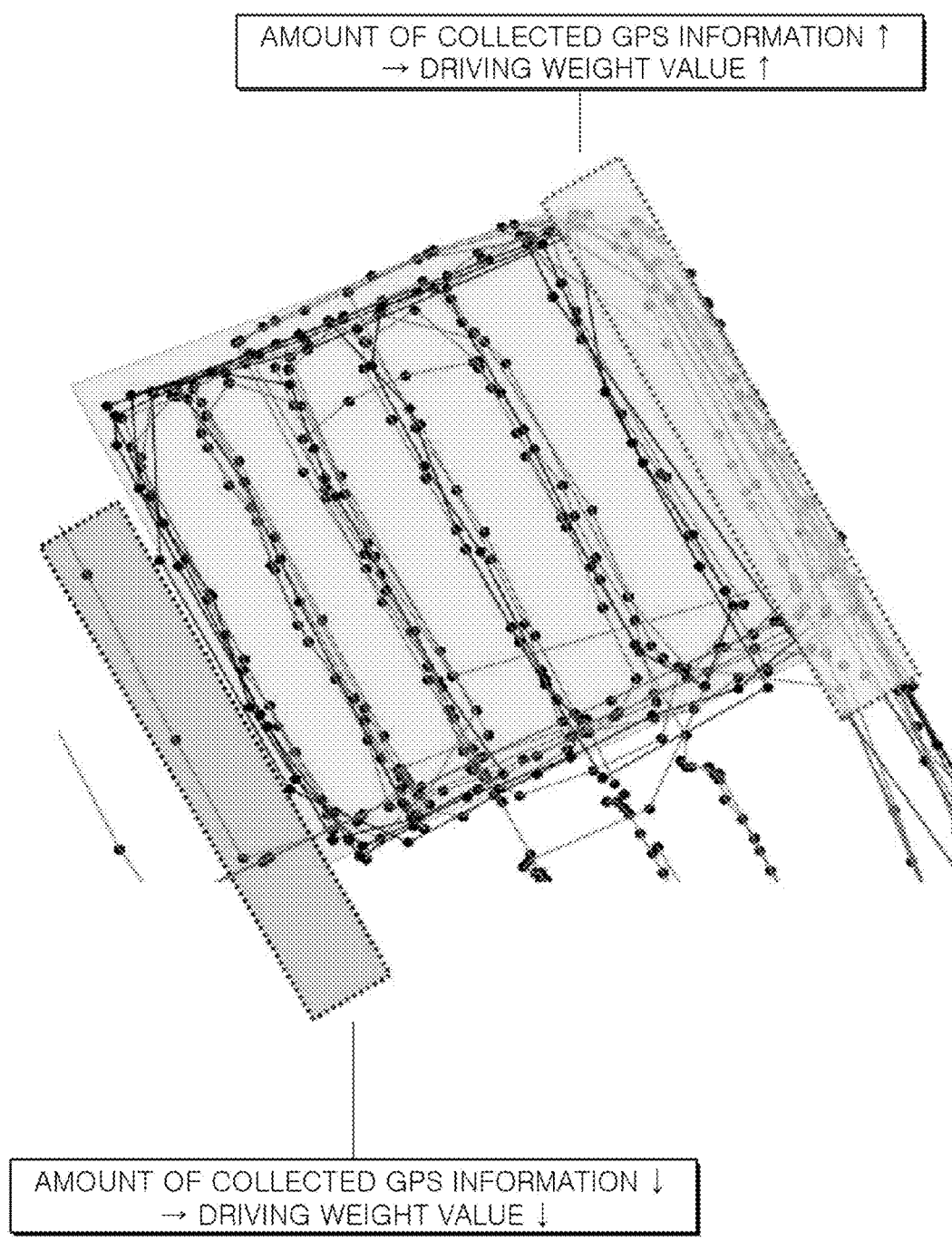
FIG. 2 is a diagram showing pieces of global positioning system (GPS) data information for generating the parking route.
Figure 3:
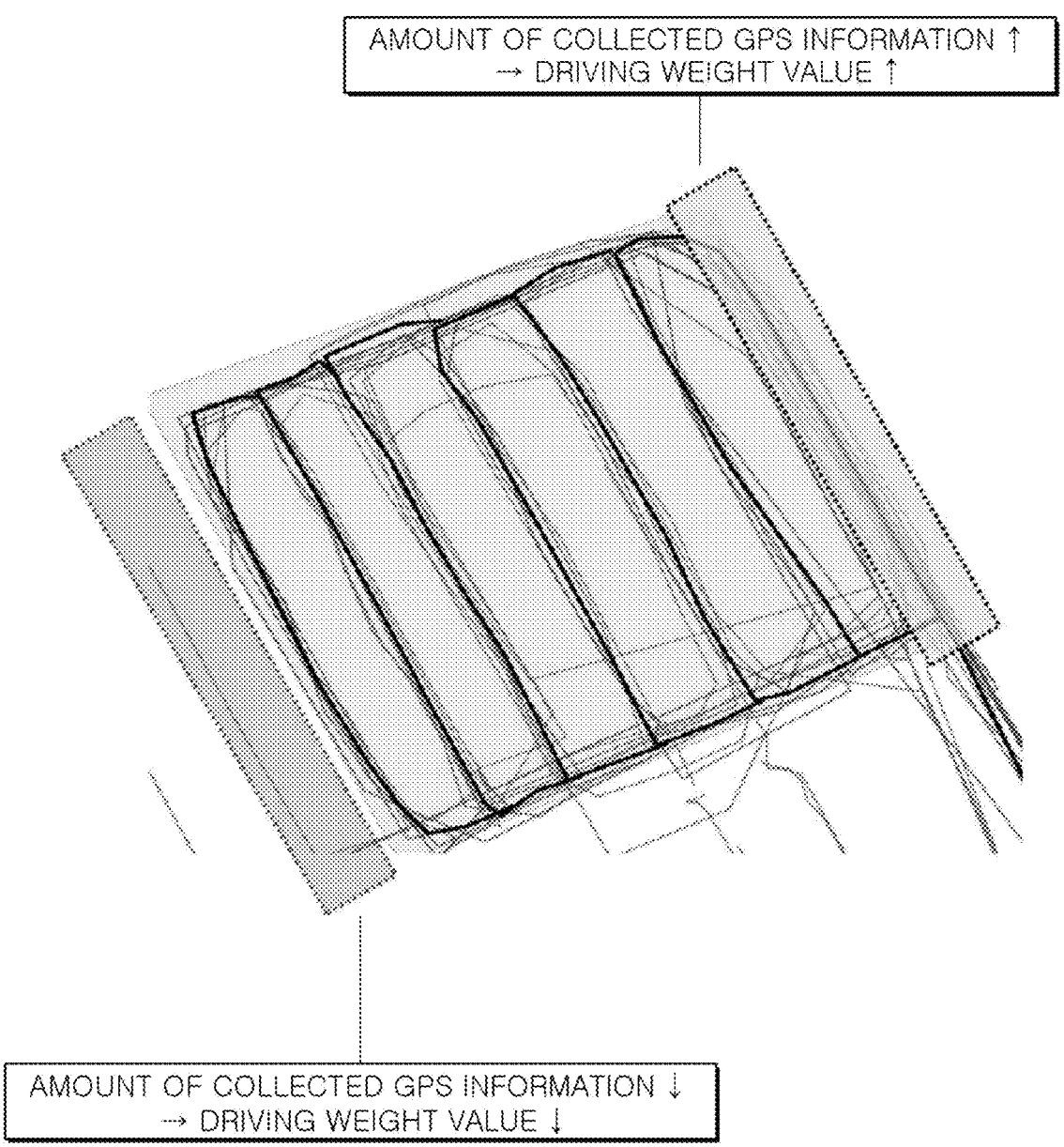
FIG. 3 is a diagram illustrating an example of establishing a link using the pieces of GPS data information to generate a parking route.
Figure 4:
FIG. 4 is a diagram illustrating an example of configuring a driving route for autonomous parking.

FIG. 1 is a diagram illustrating a method of generating a parking route in a method of providing parking information, FIG. 2 is a diagram showing pieces of global positioning system (GPS) data information for generating a parking route, FIG. 3 is a diagram illustrating an example of establishing a link using the pieces of GPS data information to generate the parking, and FIG. 4 is a diagram illustrating an example of configuring a driving route for autonomous parking.

Hereinafter, a method of providing parking information for autonomous parking according to an aspect of the present disclosure will be described with reference to FIGS. 1 to 4.

The method of providing parking information for autonomous parking includes a method of generating and updating parking information corresponding to a driving route for parking an autonomous driving vehicle based on a connected car in a parking lot through a data storage/processing center corresponding to one or more servers, which communicate with the autonomous driving vehicle, and provide the parking information to the autonomous driving vehicle. One of skill in the art will appreciate that each of the one or more servers of the data storage/data processing center may include memory configured to store data and a processor, or the like, configured to execute instructions stored in the memory and perform elements of the methods described herein.

FIG. 1 illustrates a method of configuring a parking lot map for providing parking information.

That is, the autonomous driving vehicle archives and stores a parking lot map (S11), determines whether to arrive at a parking lot (S12), and records pieces of global positioning system (GPS) information (S13).

Then, the autonomous driving vehicle transmits the pieces of GPS information, which are recorded and stored, to the data storage/processing center through a communication network (S14).

The data storage/processing center stores the pieces of GPS information received from the autonomous driving vehicle (S15).

The autonomous driving vehicle acts as a probe to obtain pieces of GPS information as shown in FIG. 2.

Then, the data storage/processing center connects the pieces of GPS information to establish forms a link as shown in FIG. 3 (S16).

A total parking lot map as shown in FIG. 4 is configured by the established (S17), and a weight value is assigned to each of driving routes.

When a map is configured with the collected pieces of GPS data information, there is a possibility that reliability of a driving route is degraded according to an amount and up-to-dateness of the collected pieces of GPS data information.

Therefore, as shown in FIGS. 2 and 3, a driving weight value is assigned to a link having a large amount and up-to-dateness of the collected pieces of GPS data information, and thus when the autonomous driving vehicle enters a parking lot, a driving route is provided through the link having the large amount and the up-to-dateness of the collected pieces of GPS data information.

When the driving route is configured by selecting only one of the large amount and the up-to-dateness of the collected pieces of GPS data information, reliability may be degraded.

That is, when only the up-to-dateness of the collected pieces of GPS data information is utilized and a driving route is configured such that one specific probe passes through a parking space where no vehicle is present, there may occur a driving route through which a vehicle cannot pass, and when the amount of the collected pieces of GPS data information is utilized, a lot of probes are collected but there may occur a driving route guiding a vehicle to a road through which the vehicle cannot pass due to a latest change of a parking lot.

In order to address this, a weight value assignment is performed by assigning a (+) weight value to a section having a large amount of collected pieces of GPS data information and applying a (−) weight value to a section having a low up-to-dateness of collected pieces of GPS data information.

Figure 5:
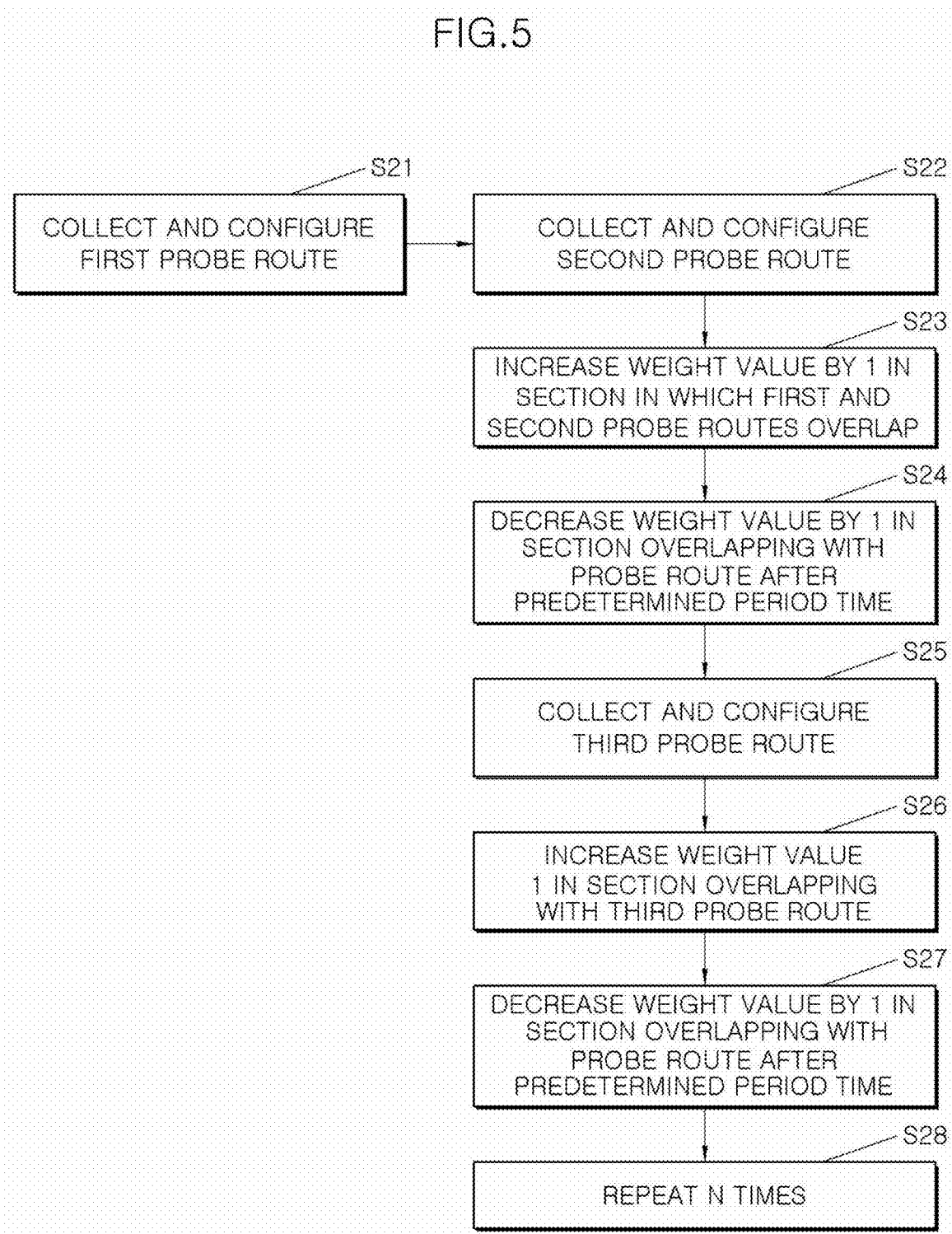
FIG. 5 is a diagram illustrating a method of calculating a weight value for a route in the method of providing parking information.

FIG. 5 is a diagram illustrating a method of calculating a weight value for a driving route, and FIGS. 6 and 7 are diagrams illustrating examples of calculating a weight value through the method of calculating a weight value of FIG. 5.

The data storage/processing center collects and configures a driving route of a first probe (S21), and sequentially collects and configures a driving route of a second probe (S22).

Then, in a section where the driving routes of the first and second probes overlap, a weight value is increased by 1 in consideration of the collected amount (S23).

Further, in a section overlapping with the probe driving route after a predetermined period of time, a weight value is decreased by 1 (S24).

Thereafter, a driving route of a third probe is collected and configured (S25), and similarly, a weight value in a section where the driving route of the third probe overlaps is increased by 1 (S26), and in a section overlapping with the probe driving route after a predetermined period of time, a weight value is decreased by 1 (S27).

The driving route collection for each probe and the calculation of the weight values are repeated N times (S28), and the weight values are assigned to the driving routes of the parking lot map configured by the link.

FIG. 6 illustrates an example of the results obtained by the above-described method of calculating a weight value.

In the example, weight values in the range of 1 to 21 are assigned to driving routes.

Next, a corrected secondary weight value is calculated for the primary weight value calculation result.

The secondary weight value is calculated by subtracting an existing weight value from a maximum weight value among the primary weight value calculation results. In the example, the maximum weight value among the primary weight value calculation results is 21.

The reason for calculating the secondary weight value is that there is a constraint in selecting a driving route having a low cost in a driving route search.

That is, when the driving route search is configured by selecting a high cost, a phenomenon may occur in which cost is increased by infinitely searching a specific driving route and execution of the driving route search is not terminated.

For this reason, the secondary weight value calculation is a method of lowering a weight value when up-to-dateness and a collection frequency of pieces of GPS data information are high.

As described above, the data storage/processing center configures a parking lot map in which a weight value is assigned to each link and provides pieces of parking lot map information to the autonomous driving vehicle, such that the autonomous driving vehicle may perform autonomous driving.

Figure 8:
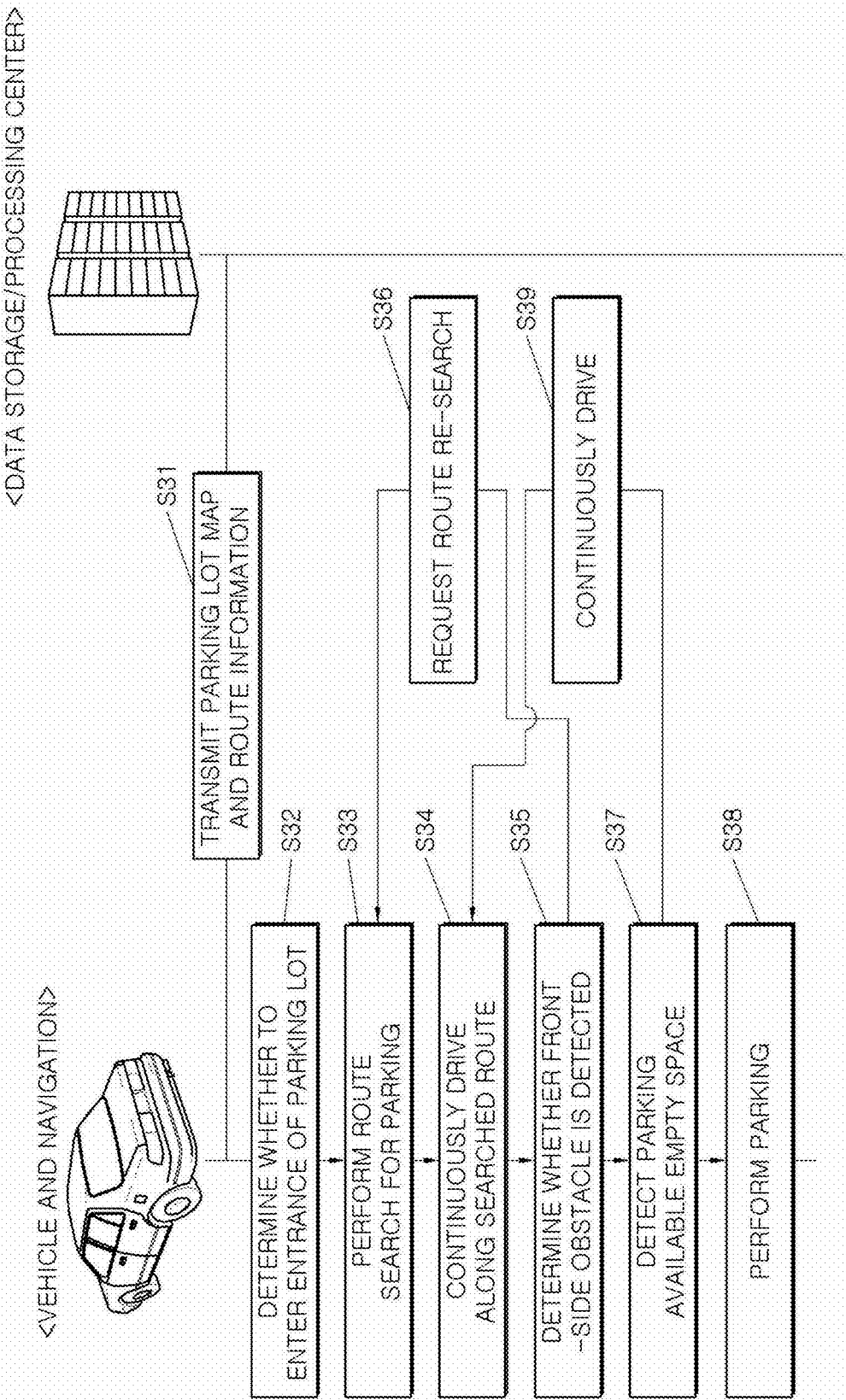
FIG. 8 is a diagram illustrating a method of performing autonomous parking through the method of providing parking information.
Figure 9:
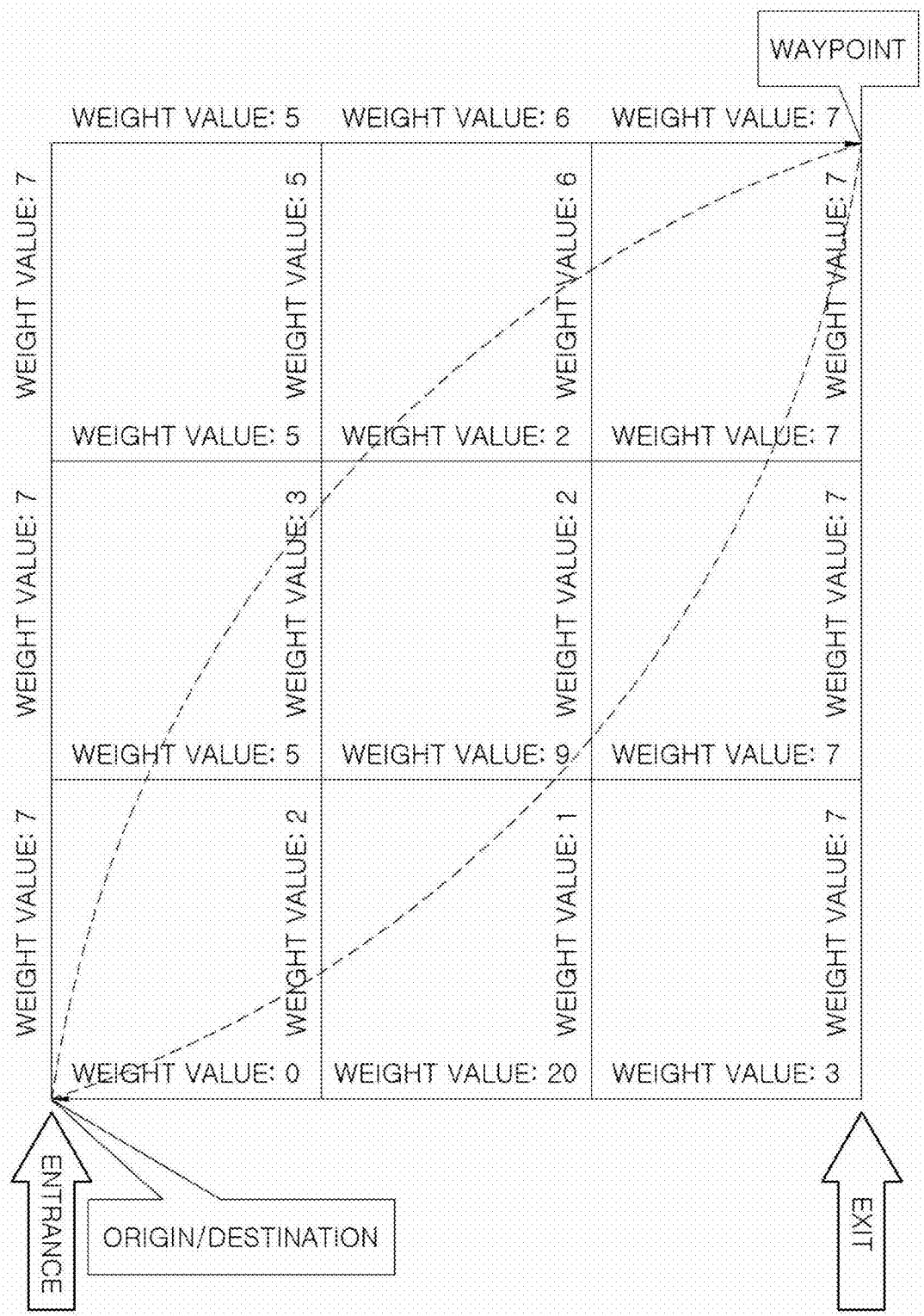
FIGS. 9 to 11 are diagrams illustrating examples of setting a driving route through the method of performing autonomous parking of FIG. 8.
Figure 10:
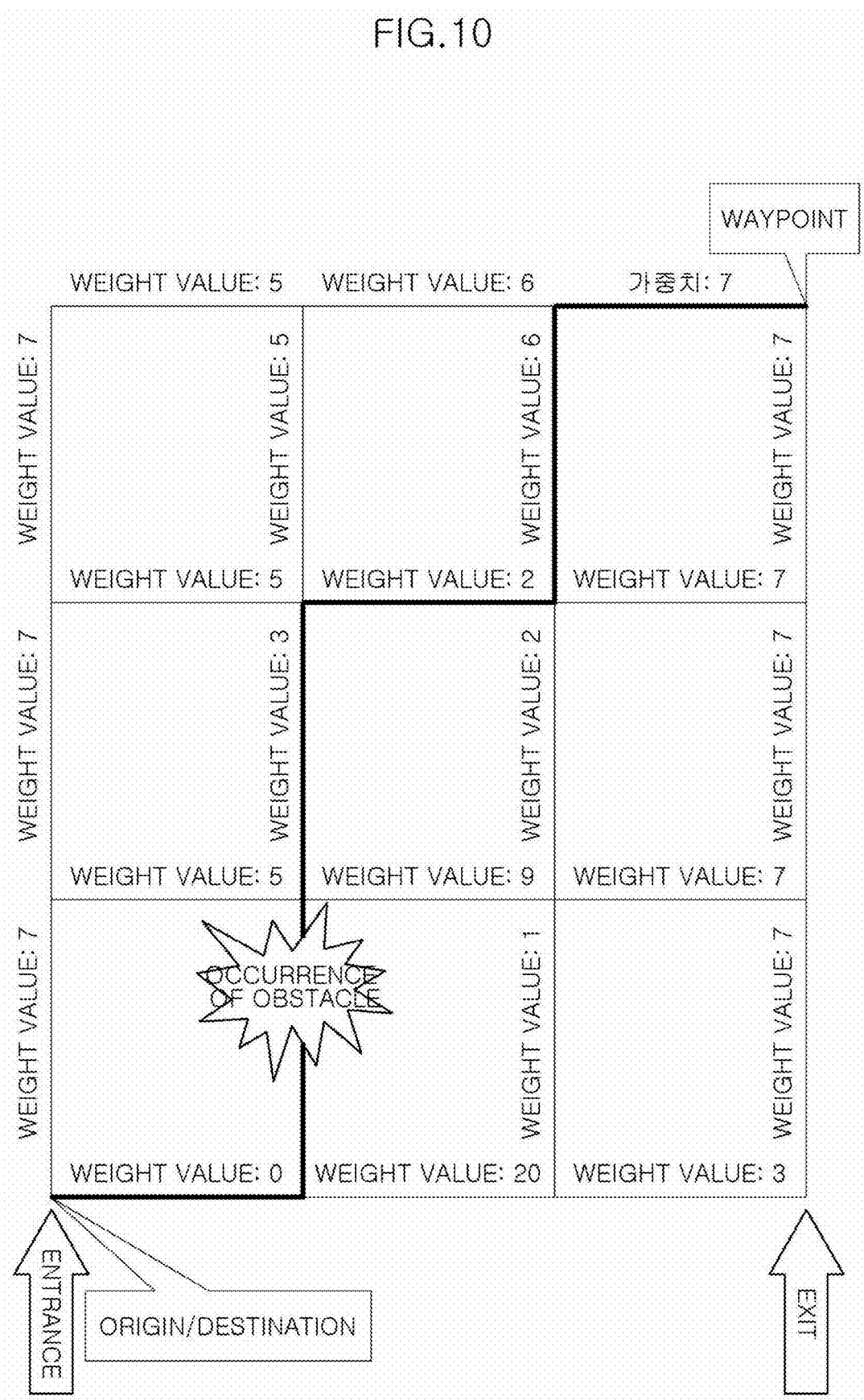
Figure 11:
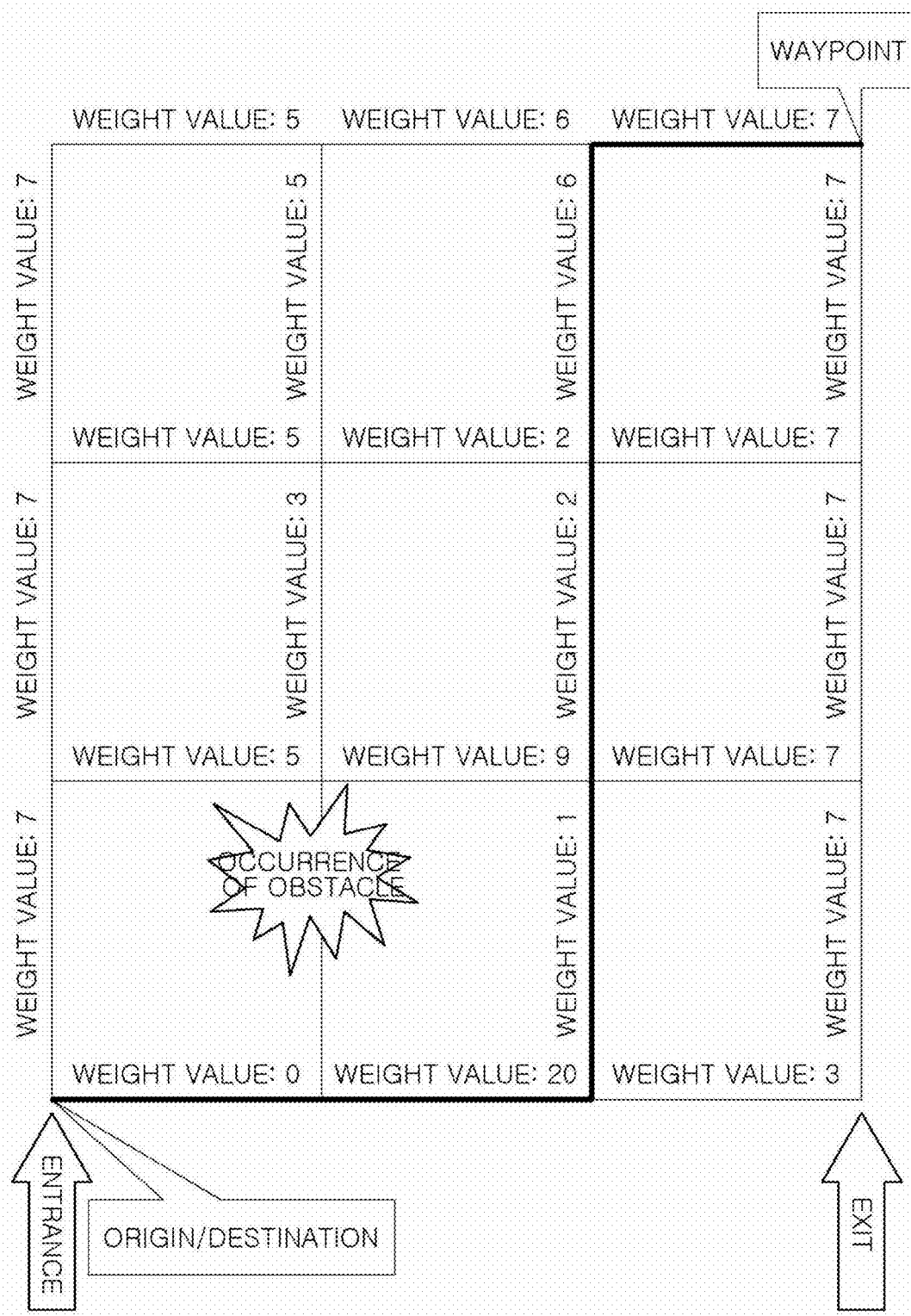

FIG. 8 illustrates a method of performing autonomous parking, and FIGS. 9 to 11 illustrates examples of setting a driving route through the method of performing autonomous parking.

The data storage/processing center transmits the parking lot map information configured by the method of FIG. 1 to the autonomous driving vehicle (S31).

The autonomous driving vehicle determines as entering an entrance of the parking lot (S32) and performs a driving route search for parking on the basis of the parking lot map information received in the operation S31 (S33).

Then, the autonomous driving vehicle is driving for the autonomous parking along the driving route searched in the operation S33 (S34).

When a front-side obstacle is detected (S35), a driving route re-search is requested (S36), and the autonomous driving vehicle performs a new driving route search (S33).

When a parking available space is detected by the driving in the operation S34 (S37), the parking is performed (S38), and otherwise, when the parking available space is detected, the driving is continued (S39).

More specifically, in the driving route search in the operation S33, as shown in FIG. 9, a position farthest away from the entrance is first selected as a waypoint, and the entrance is selected as a next destination.

Then, when arriving at the waypoint, the autonomous driving vehicle searches a driving route to the entrance with the same logic.

The driving route to the waypoint to which the weight value is assigned point is shown in FIG. 10.

That is, the driving route is searched so as to select a link having a low weight value.

However, when an obstacle occurrence section such as a city is detected, a new driving route is searched as shown in FIG. 11.

Further, a weight value is additionally and continuously assigned to the driving route which has passed once, such that it may increase a probability for the autonomous driving vehicle which does not pass next time through the driving route that was passed.

Furthermore, in order to allow the autonomous driving vehicle to continuously drive without passing an entrance or exit, it may be configured such that links to the entrance and exit are excluded when the driving route search is performed.

As described above, in accordance with a method of providing parking information for autonomous parking, a data storage/processing center configures and provides a parking lot map and pieces of driving route information, to which weight values are assigned, to an autonomous driving vehicle entering a parking lot, such that the autonomous driving vehicle can effectively perform autonomous parking.

In accordance with a method of providing parking information for autonomous parking, it is possible to more accurately provide a driving route map for the parking lot using a connected car.

Further, the driving route map as well as priority of each driving route on the basis of the weight values are determined, and thus the autonomous driving vehicle can configure an autonomous driving route in the parking lot on the basis of pieces of corresponding information, such that the autonomous driving vehicle can be guided more easily and accurately to perform parking.

It will be apparent to those skilled in the art that various changes and modifications may be made without departing from the spirit and scope of the disclosure as defined in the following claims. Accordingly, it should be noted that such alterations or modifications fall within the claims.

What is claimed is:

1. A method of providing parking information for autonomous parking, comprising:
   receiving, by an autonomous driving vehicle based on a connected car entering a parking lot, pieces of global positioning system (GPS) information for a plurality of driving routes in the parking lot from the connected car;
   configuring a map of the parking lot on the basis of the received pieces of GPS information;
   assigning a low weight value to a driving route of the plurality of driving routes on the map after a predetermined amount of time;
   assigning a high weight value to each of the plurality of driving routes on the map when an amount of the pieces of GPS information collected from the connected car becomes larger;
   selecting the driving route having the low weight value on the map according to a request of the autonomous driving vehicle entering the parking lot; and
   providing the selected driving route to the autonomous driving vehicle.

2. The method of claim 1, further comprising:
   selecting the selected driving route by excluding the driving route having the low weight value in which an obstacle is detected on the map.

3. The method of claim 1, further comprising:
   selecting a position farthest away from an entrance of the parking lot as a waypoint on the selected driving route, and selecting the waypoint as a next destination.

4. The method of claim 1, further comprising:
   additionally assigning a weight value to the selected driving route on the map where the autonomous driving vehicle passes.

5. The method of claim 1, further comprising:
   selecting the selected driving route by excluding a driving route of the plurality of driving routes on the map, which is adjacent to an entrance and an exit of the parking lot.

6. A service server for providing parking information for autonomous parking, the service server comprising:
a memory configured to store:
pieces of global positioning system (GPS) information for a plurality of driving routes in a parking lot, which are received from an autonomous driving vehicle based on a connected car entering a parking lot; and
a map of the parking lot which is configured on the basis of the received pieces of GPS information; and
a processor configured to execute instructions stored in the memory and to:
assign a low weight value to a driving route of the plurality of driving routes on the map after a predetermined amount of time;
assign a high weight value to each of the plurality of driving routes on the map when an amount of the pieces of GPS information collected from the connected car becomes larger;
select the driving route having the low weight value on the map, which is provided to the connected car according to a request of the connected car entering the parking lot; and
provide the selected driving route to the connected car entering the parking lot.

7. The service server of claim 6, wherein the processor is configured to select the selected driving route by excluding the driving route having the low weight value in which an obstacle is detected on the map.

8. The service server of claim 6, wherein the processor is configured to:
select a position farthest away from an entrance of the parking lot as a waypoint on the selected driving route, and
select the waypoint as a next destination.

9. The service server of claim 6, wherein a weight value is additionally assigned to the selected driving route on the map where the autonomous driving vehicle passes.

10. The service server of claim 6, wherein the processor is configured to select the selected driving route by excluding a driving route of the plurality of driving routes on the map, which is adjacent to an entrance and an exit of the parking lot.

11. A system for providing parking information for autonomous parking, the system comprising:
a connected car configured to enter a parking lot and transmit pieces of global positioning system (GPS) information for a plurality of driving routes in the parking lot; and
a service server configured to provide parking information for autonomous parking by configuring a map of the parking lot on the basis of the pieces of GPS information received from the connected car;
assigning a low weight value to a driving route of the plurality of driving routes on the map after a predetermined amount of time;
assigning a high weight value to each of the plurality of driving routes on the map when an amount of the pieces of GPS information collected from the connected car becomes larger;
selecting a driving route having the low weight value of the plurality of driving routes on the map of the parking lot; and
providing the selected driving route to the connected car entering the parking lot.

* * * * *